United States Patent
Nie et al.

(10) Patent No.: US 7,631,277 B1
(45) Date of Patent: Dec. 8, 2009

(54) SYSTEM AND METHOD FOR INTEGRATING MEDIA OBJECTS

(75) Inventors: Xiaochun Nie, Cupertino, CA (US); Christopher L. Flick, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 917 days.

(21) Appl. No.: 10/022,151

(22) Filed: Dec. 14, 2001

(51) Int. Cl.
G06F 3/048 (2006.01)
G06F 3/00 (2006.01)
G06T 15/00 (2006.01)
G09G 5/00 (2006.01)

(52) U.S. Cl. .................. 715/848; 715/731; 715/757; 715/764; 345/419; 345/649; 345/672; 345/633

(58) Field of Classification Search .............. 345/731, 345/730, 840, 850, 767, 423, 851, 653, 679, 345/473, 672, 649, 419, 633; 707/104.1; 715/500.1, 848, 731, 764, 757
See application file for complete search history.

(56) References Cited

U.S. PATENT DOCUMENTS

| 5,019,809 | A | | 5/1991 | Chen |
| 5,396,583 | A | | 3/1995 | Chen et al. |
| 5,446,833 | A | | 8/1995 | Miller et al. |
| 5,588,104 | A | * | 12/1996 | Lanier et al. ............... 715/848 |
| 5,724,106 | A | * | 3/1998 | Autry et al. ................ 348/734 |
| 5,745,665 | A | * | 4/1998 | Pasco ........................ 345/427 |
| 5,926,190 | A | | 7/1999 | Turkowski et al. |
| 6,072,479 | A | * | 6/2000 | Ogawa .................... 707/104.1 |
| 6,081,262 | A | * | 6/2000 | Gill et al. ................. 715/500.1 |
| 6,275,935 | B1 | * | 8/2001 | Barlow et al. ............... 713/182 |
| 6,484,189 | B1 | * | 11/2002 | Gerlach et al. .............. 345/730 |
| 6,525,732 | B1 | * | 2/2003 | Gadh et al. ................. 345/428 |
| 6,664,986 | B1 | * | 12/2003 | Kopelman et al. .......... 715/849 |
| 2003/0011630 | A1 | * | 1/2003 | Knowlton et al. ........... 345/731 |
| 2004/0039934 | A1 | * | 2/2004 | Land et al. ................. 713/200 |

FOREIGN PATENT DOCUMENTS

WO WO 9815920 AL * 4/1998
WO WO 02/27659 A2 4/2002

OTHER PUBLICATIONS

Mark Segal and Kurt Akeley, "The OpenGL Graphics System: A Specification (Version 1.3)," Aug. 14, 2001.
Wang, Ru-Shang, et al., "Multiview Video Sequence Analysis, Compression, and Virtual Viewpoint Synthesis," IEEE Transactions on Circuits and Systems For Video Technology, vol. 10, No. 3, Apr. 3, 2000, pp. 397-410.

* cited by examiner

Primary Examiner—Ting Zhou
(74) Attorney, Agent, or Firm—Blakely, Sokoloff, Taylor & Zafman LLP

(57) ABSTRACT

System and method for integrating media objects for viewing on and manipulation via a computing device such as a personal computer. The system and method may be provided via an application program interface (API) which provides functions that allow an application program to create a scene and add media objects to the scene. The method includes preparing a translation vector and a rotation matrix for each of the media objects to define an orientation and a location of each of the media objects in the scene. The scene including the media objects is displayed. An interface is provided so that a user may manipulate the scene and the objects therein. The system and method may be implemented on a personal computer or other computing device.

75 Claims, 7 Drawing Sheets

SYSTEM AND METHOD FOR INTEGRATING MEDIA OBJECTS

BACKGROUND

1. Field of the Invention

This invention relates to the field of application program interfaces for supporting media objects. More specifically, the invention relates to a system and method for integrating media objects for viewing on and manipulation via a computing device such as a personal computer.

2. Background

Computers and other processor based devices handle many kinds of data. Various kinds of data may be accessed by computers, including two-dimensional (2D) objects and 2D virtual reality enhanced images having three-dimensional (3D) properties. Operating systems provide utilities which may be used by application programs for various purposes, including the low-level handling of media objects. Many operating systems do not provide more than rudimentary support for the handling of 2D media objects and do not generally support enhanced 2D media objects. Additional utilities may be provided via application program interfaces commonly referred to as APIs. Some extensions to operating systems may provide the facility to separately view various kinds of 2D media objects. One such operating system extension is the QuickTime® System from Apple Computer, Inc. of Cupertino, Calif. The ability to integrate multiple 2D media objects and 3D enhanced 2D objects into a scene having 3D properties and to then manipulate the scene and the objects is not provided in current operating systems and operating systems extensions.

BRIEF DESCRIPTION OF THE DRAWINGS

The invention described herein is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 5D illustrates an example viewable scene that includes a first object integrated with a second object after the field of view of the scene has been by zooming in.

DETAILED DESCRIPTION

The invention described herein provides various embodiments of a method and system for integrating two-dimensional (2D) and three-dimensional (3D) media objects for viewing on and manipulation via a computing device such as a personal computer. As many operating systems provide only rudimentary support for handling 2D and 3D media, the various embodiments of the system and method described herein may be implemented as an application program interface (API) which allows application programs to take advantage of the features of the method and system for integrating 2D and 3D media objects described herein. The various embodiments of the system and method described herein may be incorporated as part of an operating system or provided as an extension of an operating system which exists between the operating system and application programs.

Figure 1:
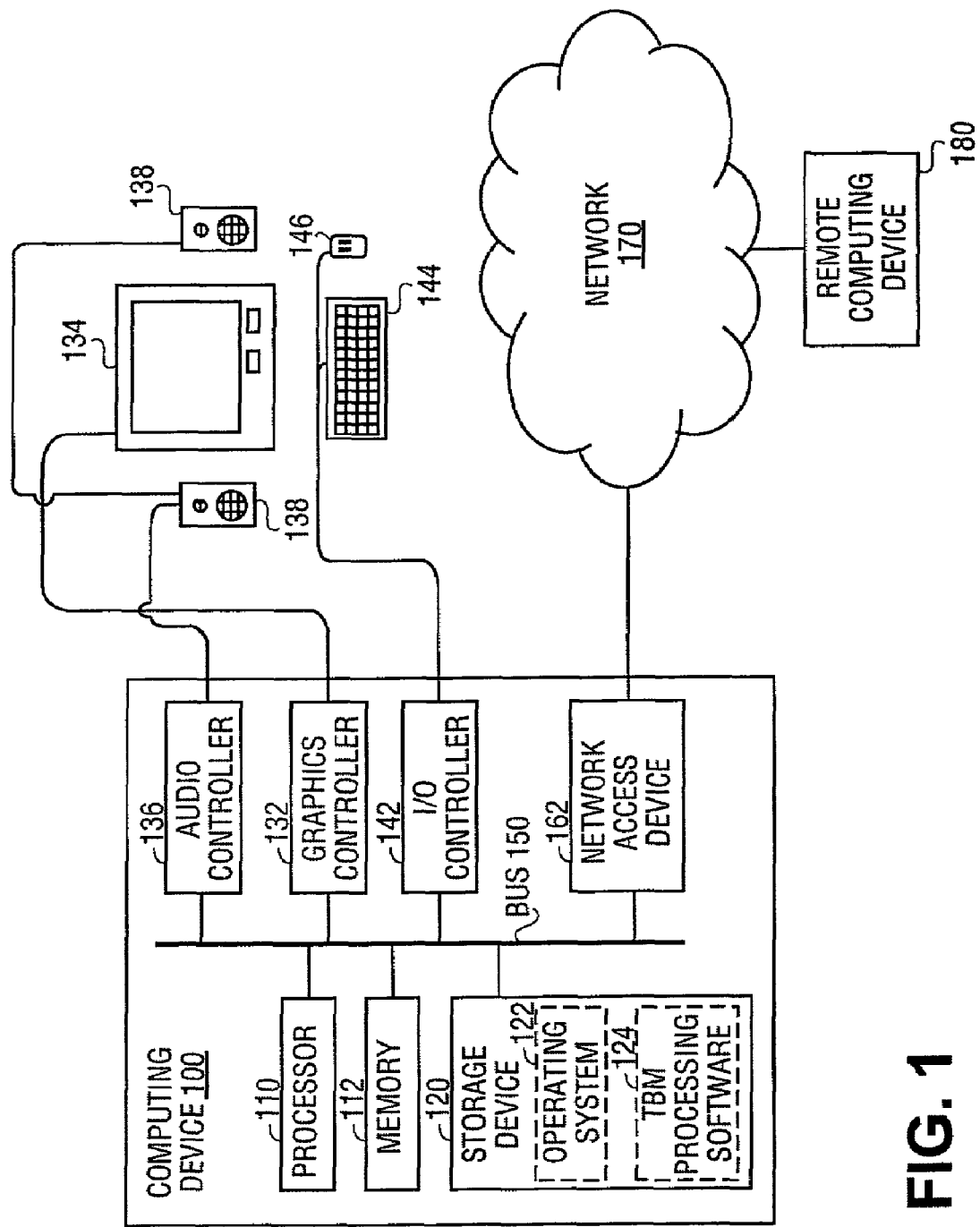
FIG. 1 illustrates a personal computing device and environment in which the embodiments of the method and system described herein may be implemented.

FIG. 1 illustrates a personal computing device and environment in which the embodiments of the method and system described herein may be implemented. Computing device 100 may be any computing device that can execute software programs, including, but not limited to, personal computers, servers, cellular telephones, computer tablets, personal digital assistants, portable computers, computer workstations, etc. Computing device 100 may comprise a processor 110 to execute software programs. Processor 110 may be any computer processor known to those skilled in the art. Although only one processor is shown, two or more processors may be included in computing device 100. When executing programs, processor 100 utilizes memory 112. Memory 112 may be any form of random access memory (RAM) known to those skilled in the art. Information is read from and written to storage device 120. Storage device 120 may be any kind of machine readable medium including, for example, magnetic media such as disk drives and magnetic tape; optical drives such as compact disk read only memory (CD-ROM) and readable and writeable compact disks (CD-RW); stick and card memory devices; ROM, RAM, flash memory devices and the like; whether internal, such as storage device 120 and, in other embodiments, directly coupled, accessible locally or remotely via network 170, and accessible via electrical, optical, acoustical or other form of propagated signals (e.g., carrier waves, infrared signals, digital signals, etc.) via network access device 162. In various embodiments, network access device 162 may be a modem, network interface unit, or other communications device that allows for communication with other computing devices, such as remote computing device 180.

Personal computer 100 may include graphics controller 132 that allows for the display of information such as text and graphics on display monitor 134. Graphics controller 132 may be any graphics controller known to those skilled in the art, and display 134 may be any display monitor known to those skilled in the art, including, for example, a cathode ray tube (CRT) display monitor and thin film transistor (TFT) display screen. Personal computer 100 may also include audio controller 136 to which speakers 138 may be coupled. Personal computer 100 may play audio including music, voice, and synthesized sound to a user of the personal computer via audio controller 136 and speakers 138. Audio controller 136 may be any audio controller that may be compatible with the Sound Blaster® de facto standard popularized by Creative Technology Ltd. of Singapore and that may support 3D audio. A user may access computing device 100 via any input device known to those skilled in the art, such as, for example, keyboard 144, mouse 146, track ball (not shown), keypad (not shown), pen and tablet (not shown), etc. These input devices may be coupled to computing device 100 by input/output (I/O) controller 142. In one embodiment, I/O controller 142 may be a universal serial bus (USB) controller and the input devices may be USB enabled.

Processor 110, memory 112, storage device 120, graphics controller 132, I/O controller 142 and network access device 162 may be coupled to one another via and communicate with one another over bus 150. Bus 150 may be any bus known to those skilled in the art. Although only one bus is depicted, multiple buses may be used in computing device 100. In addition, other components and controllers known to those skilled in the art (not depicted) or multiple instances of depicted components and controllers may be included in computing device 100.

The methods described herein may be implemented as software and stored for execution on storage device 120 of computing device 100 as media processing software (MPS) 124. In one embodiment, the MPS may be a suite or group of software functions, programs, routines, etc. that provide data structure definitions and serve as an API to application programmers. When executing, the MPS may rely on and utilize functions and features made available by operating system 122. Operating system 122 may be stored on storage device 120 or another local or remote storage device. Operating system 122 may be any well known or proprietary operating system, such as, for example, Mac OS X available from Apple Computer, Inc. of Cupertino, Calif. In another embodiment, the MPS may be incorporated as part of an operating system. In other embodiments, the MPS may exist as hardware or as a combination of hardware and software. In one embodiment, the system and method described herein rely on and have available to them an existing set of support tools in the form of a library of functions comprising an API that provides for the manipulating, rendering and display of various 2D and 3D objects and, in some embodiments, for the rendering of stereo and/or 3D audio. An example of such a set of APIs and tools are those available in the QuickTime® 5 cross-platform multimedia software developer's toolkit available from Apple Computer, Inc. of Cupertino, Calif., such as API tool set may support the OpenGL graphics API. (See *The OpenGL® Graphics System: A Specification*, version 1.3, available from Silicon Graphics, Inc. of Mountain View, Calif.)

In various embodiments, the system and method described herein allow for the integrating, compositing or combining of two or more kinds of 2D and 3D objects into a scene. The scene is said to include various scene objects. In one embodiment, a soundtrack may be associated with a scene. In another embodiment, a soundtrack may be included with an object such that when an object is activated by a user such as by a mouse click, the soundtrack is played. In one embodiment, when an object in a scene is manipulated by a user, such as by dragging the object via a mouse, the location of the audio associated with the object may be changed to reflect the manipulation and position in the 3D scene. That is, for example, the audio may be rendered to be played from left to center to right as an object is dragged across a scene. In these embodiments, the soundtrack may be stored according to any well-known format such as, for example, the audio interchange file format (AIFF), Moving Picture Experts Group audio level 3 (MP3) format, and wave format (WAV). In these embodiments, the MPS may play the soundtrack by invoking a library function, an operating system utility, or a stand-alone audio application program.

The location and perspective from which a user may view the scene may be defined by what is referred to as a scene camera and may also be referred to as a camera view. In one embodiment, multiple scene cameras for a scene may be supported such that a user may switch back and forth between two, and in other embodiments, more, scene cameras. In various embodiments, there may be multiple and varied supported 2D and 3D objects. In various embodiments, multiple formats of 2D and 3D objects may be supported including, for example, OpenGL3D. An example of a 2D media object is a bitmap image which, in one embodiment, may be known as a sprite. In one embodiment, the source for a sprite can be a single bitmap, a bitmap image sequence, a vector image, a video track, a live stream, or a source specified by a uniform resource locator (URL). Examples of 3D media objects include object movies and OpenGL 3D objects. Object movies are not truly movies and are not truly 3D, but they are an enhanced form of 2D having some 3D properties. Although not truly 3D entities, object movies and other similarly enhanced 2D objects will be referred to as 3D objects and as enhanced 2D objects herein. Object movies are created by photographing or rendering a series of views of the subject at carefully spaced angles of tilt and rotation and assembling the images. In one embodiment, each view of the subject in an object movie is a still image. In another embodiment, one or more views of the subject of an object movie may be a video clip or animation. In one embodiment, an object movie may be created by photographing a series of images of an object as the object is rotated on a platter along different axes. In another embodiment, the series of images comprising an object movie may be captured when rotating a camera from around the object along different axes from a fixed distance.

Figure 2:
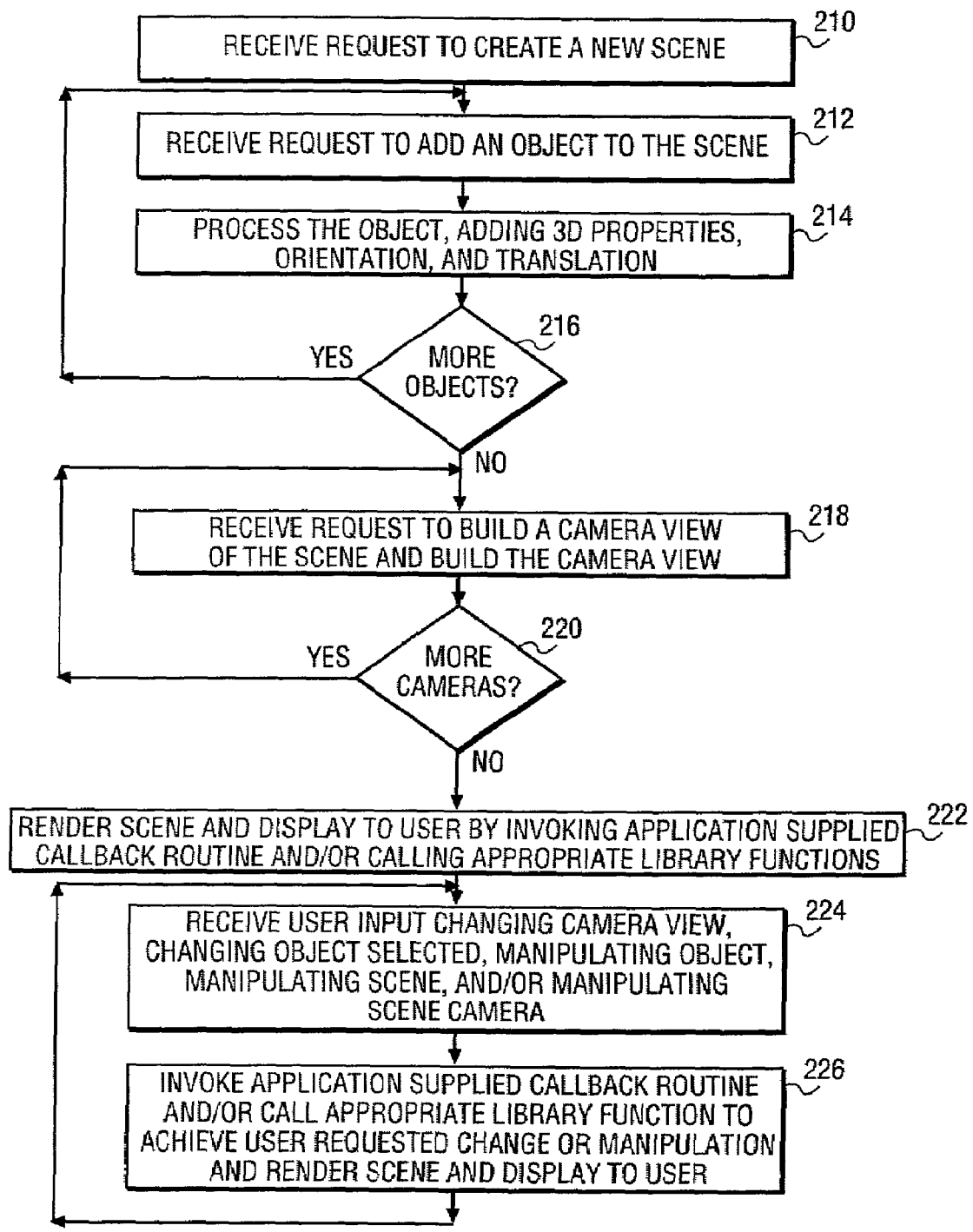
FIG. 2 illustrates the flow of actions taken according to an embodiment of a method to integrate media objects into a scene.

FIG. 2 illustrates the flow of actions taken according to an embodiment of a method to integrate 2D and 3D objects. In practice, after a computing device is up and running the MPS will register with the operating system according to well-known methods. The MPS may receive a request to create a new scene, as shown in block 210. This request is in the form of a function call from an application program written according to the MPS API. The MPS then receives a request to add an object to the scene, as shown in block 212. Upon receiving the request, depending on the type of object, the MPS processes the object to create a scene object, including adding 3D properties to the scene object and setting the orientation and translation of the scene object with respect to the scene, as shown in block 214. If there are more objects to be added to the scene, as shown in block 216, blocks 212 and 214 are repeated. After all objects to be included in the scene have been added to the scene, the MPS may receive a request to build a camera view of the scene and may build the requested camera view, as shown in block 218. If more camera views are to be added for the scene, as shown in block 220, block 218 is repeated until no further camera views are to be added and built. The opening scene will then be rendered and displayed to a user by the MPS invoking an application supplied callback routine and/or calling one or more appropriate library functions, as shown in block 222. In one embodiment, the opening scene may be set by a special API, may be set by a variable or argument passed with the create scene API, or may be system chosen according to default requirements. In one embodiment, the MPS invokes the callback routine which in turn calls one or more library functions. In another embodiment, the MPS may directly call the library functions, and may then invoke the callback routine.

To achieve the functionality described in the prior paragraph, the scene manager maintains pertinent data about each object, the relationship of each object to the other objects, and the relationship of each object to the scene, including layering data. It is the layering data which may be used to determine which objects are in front of other objects, and consequently, which objects are background and foreground. In various embodiments, each object may also include opacity data. In one embodiment, opacity data may be included in an alpha channel associated with the objects. Various degrees of opacity may be supported, including, for example, fully transparent, half transparent, and varying degrees of transparency. In one embodiment, the MPS calls library functions to display each of the objects in the scene. In doing so, the MPS maintains the position of each object relative to the scene and maintains the camera view relative to the scene. Although referred to as a camera view, the camera view or scene camera is actually the point and perspective from which a user will view a display of the scene.

In one embodiment, as part of displaying the scene, the user is provided the opportunity to control the view of the scene such as by panning to the left and right, tilting up and down, and zooming in and out. The user may also, in some embodiments, be able to change the point of view, also referred to as the point of reference. The MPS may receive user input, which may, in one embodiment, be in the form of mouse movement and mouse click as well as keyboard input, changing the camera view, changing the object selected, manipulating the object, manipulating the scene, and/or manipulating the scene camera, as shown in block 224. As to object selection, the user may be provided the ability to select which of the objects in the scene should be a current primary object or focal point. Upon receiving user input, the MPS then invokes an application program supplied callback routine and/or calls one or more appropriate library functions to achieve the user requested change or manipulation and to render and display the resulting scene, as shown in block 226. In one embodiment, calls to the library functions may be made by the callback routine, and, in other embodiments, may be made by the application program in response to the callback routine. In another embodiment, the MPS may call one or more appropriate library functions, and may then invoke the callback routine. The user may continually navigate within a scene to view as much as the scene as is desired. As such, flow then continues at block 224, and may continue in a loop until the program is exited.

Figure 3:
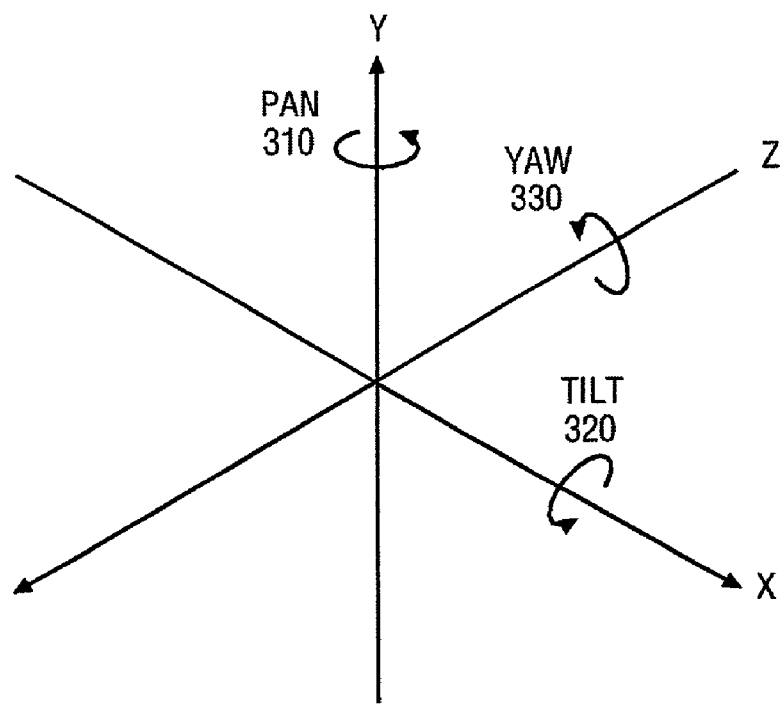
FIG. 3 illustrates a three-dimensional graph showing the effects of rotating an object or scene about each of three axes.

FIG. 3 illustrates a three-dimensional graph showing the effects of rotating an object or scene about each of three axes. Each of the objects which may be combined into a scene has its own object coordinate system in 3D space which is translated into the scene coordinate system by a translation vector. Traversing a scene such as by panning, or changing a user's view of the scene to the left or the right, will result in corresponding panning of an object contained in the scene including changes to the position and orientation of the object with respect to the scene. Panning requires that the scene be rotated about the scene's y-axis, as shown by reference number 310. When a user pans in a scene, each object or the image frames representing each object are correspondingly panned by the MPS by calling a function or tool provided by a prior art library of APIs to rotate the appropriate image frame. The input to the library function is based on the translation and orientation of the scene object with the scene according to the frame vector and the user input such that the scene is rotated along the scene's y-axis. If the object to be rotated is an object movie or other enhanced 2D object, the library function may retrieve the appropriate image frame of the object which was captured at a corresponding orientation that matches the orientation to where the user panned in relation to the scene.

Generally, tilting a scene or changing a user's view of a scene up or down, requires that the scene be rotated about the scene's x-axis, as shown by reference number 320. When a scene is to be tilted, a function or tool provided by a prior art library of APIs is called to rotate each of the objects based on the translation vector and the amount of the rotation along the scene's x-axis. In one embodiment, this may be accomplished by retrieving an appropriate image frame of the object at a corresponding orientation. Similarly, in some embodiments, support for yaw may also be provided. Changing the yaw of a scene, or changing a user's view in relation to a vertical axis, requires that the scene be rotated about the scene's z-axis, as shown by reference number 330. To rotate a scene, a function or tool provided by a prior art library of APIs is called to rotate each of the scene objects based on their translation vectors and the user requested rotation of the scene about the scene's z-axis. Depending on the object and the embodiment, the rotation may be achieved by application of a software algorithm or by retrieving an appropriate image frame captured corresponding to the desired orientation.

If the user requests that the field of view of the scene be changed by zooming in or out, the appropriate library function is called regarding each of the objects in the scene such that each of the objects is zoomed according to the user input, the translation data for each object, and the scene data. In one embodiment, the zooming may be achieved wholly algorithmically. In another embodiment, the zooming may be achieved by retrieving an appropriate image frame at a desired orientation and field of view.

Figure 4B:
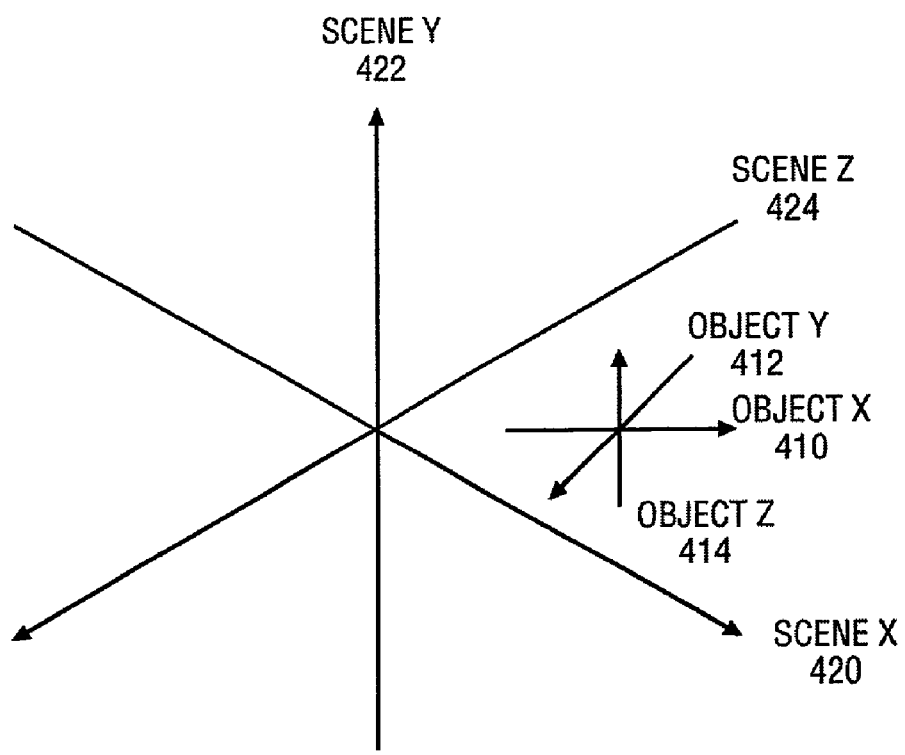
FIG. 4B illustrates an object coordinate system superimposed in a scene coordinate system.
Figure 4A:
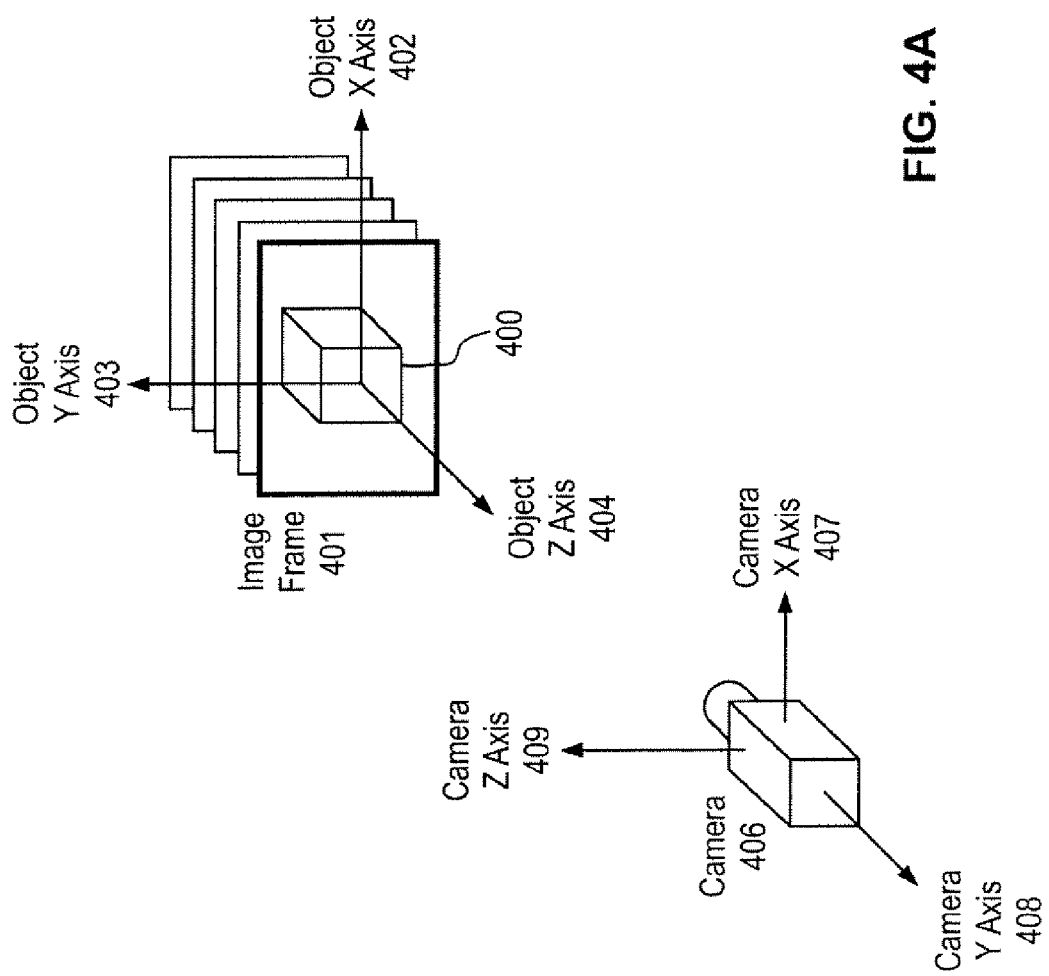
FIG. 4A illustrates a camera and its coordinate system in relation to a subject and its image frame.

FIG. 4A illustrates a camera and its coordinate system in relation to a subject and its image frame. In one embodiment, some objects in a scene may initially be captured as a series or sequence of image frames taken by a real camera of the subject that is represented as an object. Either the real camera may be rotated about the subject, or the subject may be rotated in front of the real camera to obtain the sequence of images needed to comprise the object. In this embodiment, when capturing the sequences of images of an object, the definition of the image frame is a 3×3 rotation matrix and a 3D translation vector based on the relationship between the image frame of the subject and the camera. The 3×3 rotation matrix defining subject 400 maps the orientation of image frame 401 as an object according to object x-axis 402, object y-axis 403, and object z-axis 404, and the 3D translation vector defines the position of the object in the camera coordinate system. The camera 406 obtains the image frame 401 of subject 400 from its own coordinate system having camera x-axis 407, camera y-axis 408 and camera z-axis 409.

FIG. 4B illustrates an object coordinate system superimposed on a scene coordinate system. Each object in a scene is defined as a series or sequence of image frames and orientation data. These image frames may be retrieved, accessed and manipulated by available library functions accessing the media object. Each object is initially defined in its own coordinate system. However, when creating a scene, a scene coordinate system is created. To exist in a scene, each object added to the scene must be placed at a location in the scene. The definition of where each object is to exist in a scene is determined by a translation vector which is used in conjunction with the object's coordinate system. For example, each object's position and orientation may be defined by a 3×3 matrix representing object axes 410, 412 and 414, as shown in FIG. 4B and a translation vector. The translation vector directs where to place the object in relation to scene axes 420, 422 and 424, as shown in FIG. 4B. The 3×3 rotation matrix is combined with the translation vector to form a 4×4 matrix known as a scene object.

More specifically, the 3D translation vector may be defined as $T=[x, y, z]$. The rotation transformation of T through rotation matrix R is:

$$\begin{vmatrix} xx \\ yy \\ zz \end{vmatrix} = \begin{vmatrix} R1 & R2 & R3 \\ R4 & R5 & R6 \\ R7 & R8 & R9 \end{vmatrix} * \begin{vmatrix} x \\ y \\ x \end{vmatrix} = \begin{vmatrix} R1*x + R2*y + R3*z \\ R4*x + R5*y + R6*z \\ R7*x + R8*y + R9*z \end{vmatrix}$$

Transforming a scene object in the form of a 4×4 matrix may be viewed as:

$$\begin{vmatrix} xx \\ yy \\ zz \\ 1 \end{vmatrix} = \begin{vmatrix} R1 & R2 & R3 & T1 \\ R4 & R5 & R6 & T2 \\ R7 & R8 & R9 & T3 \\ 0 & 0 & 0 & 1 \end{vmatrix} * \begin{vmatrix} x \\ y \\ x \\ 1 \end{vmatrix} = \begin{vmatrix} R1*x + R2*y + R3*z + T1*x \\ R4*x + R5*y + R6*z + T2*y \\ R7*x + R8*y + R9*z + T3*z \\ 1 \end{vmatrix}$$

This is mathematically a definition of the linear transformation. The geometrical meaning of a rotation matrix may be considered as representing three vectors such that:

$$R = \begin{Vmatrix} R1 \\ R4 \\ R7 \end{Vmatrix} \begin{Vmatrix} R2 \\ R5 \\ R8 \end{Vmatrix} \begin{Vmatrix} R3 \\ R6 \\ R9 \end{Vmatrix} = |Vx\ Vy\ Vz|$$

Transformation of the above rotation matrix results to a weighted sum of the three axes in 3D space. The three axes Vx, Vy, Vz can be of any length and orientation, and they do not have to be perpendicular to each other.

$$\begin{vmatrix} xx \\ yy \\ zz \end{vmatrix} = \begin{vmatrix} R1 & R2 & R3 \\ R4 & R5 & R6 \\ R7 & R8 & R9 \end{vmatrix} * \begin{vmatrix} x \\ y \\ x \end{vmatrix} = |Vx*x + Vy*y + Vz*z|$$

Figure 5A:
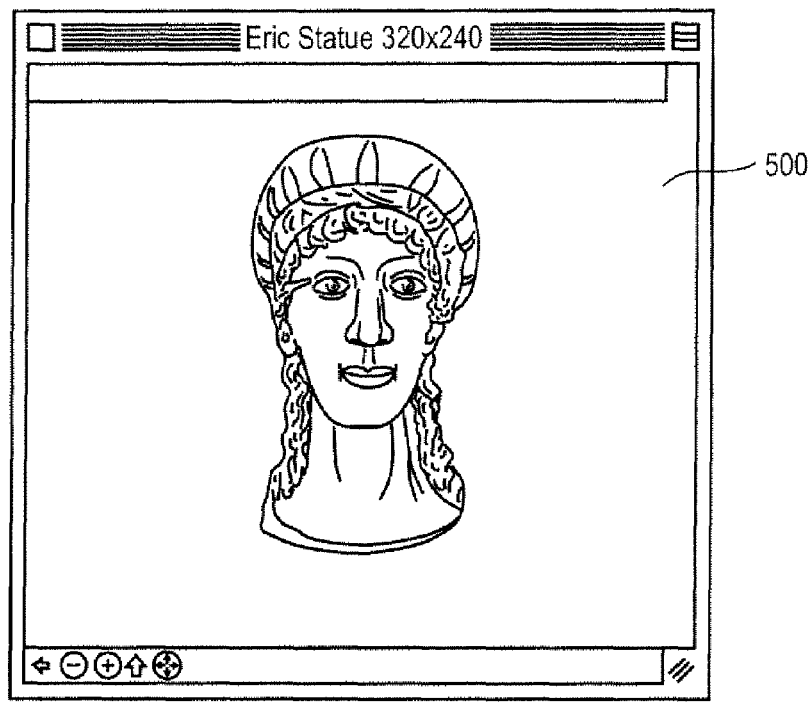
FIG. 5A illustrates a first object.
Figure 5B:
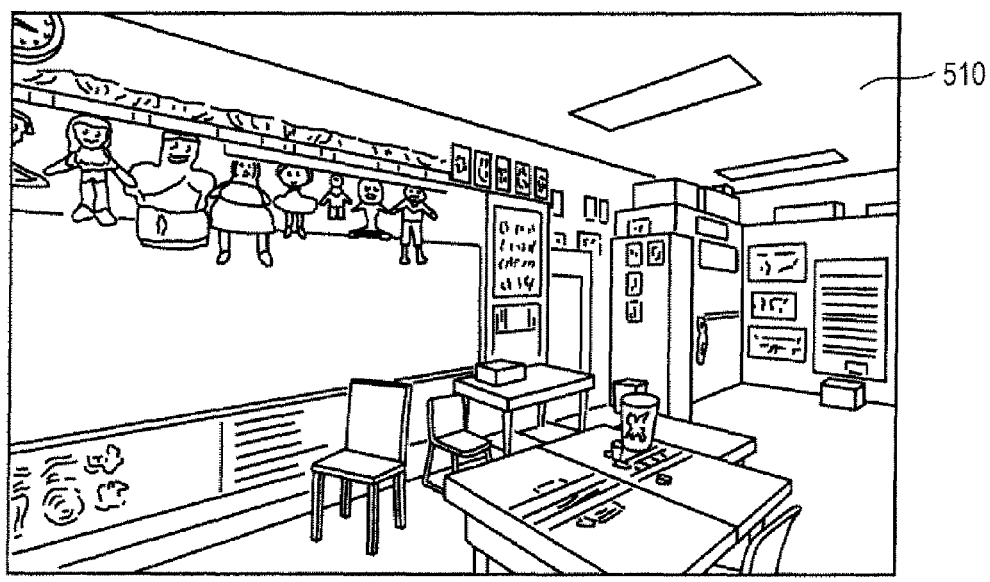
FIG. 5B illustrates a second object.
Figure 5C:
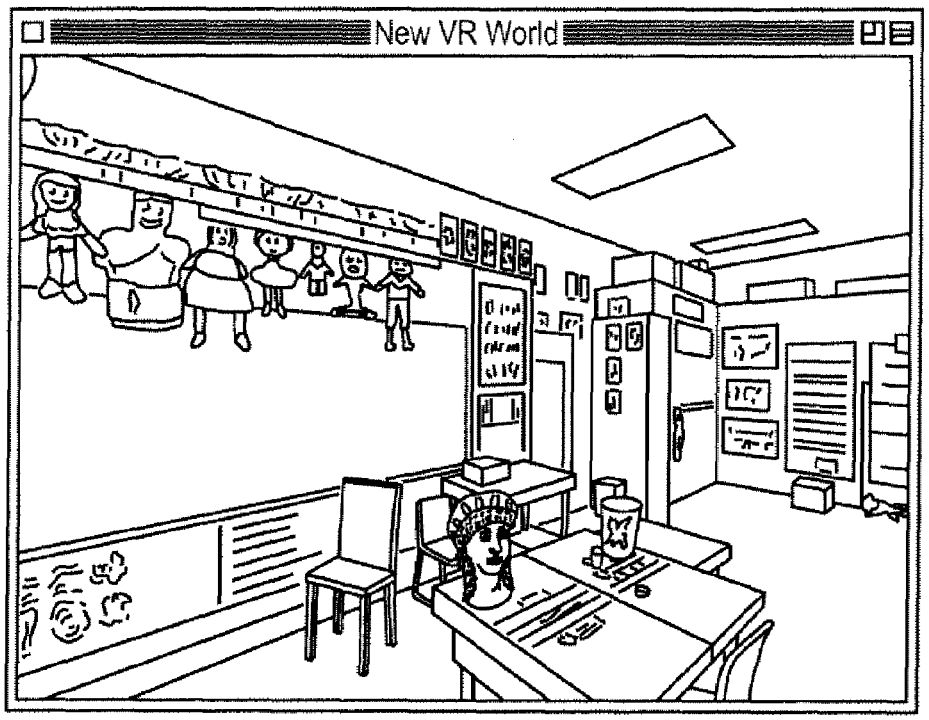
FIG. 5C illustrates an example viewable scene that includes a first object integrated with a second object.

FIG. 5A illustrates a first object, Roman bust 500. Roman bust 500 is an enhanced 2D image having 3D properties known, in one embodiment, as an object movie, a series of captured photographic images taken at various prescribed orientations. FIG. 5B illustrates a second object, school room 510. School room 510 is also an object movie. By using the MPS API described herein, a scene may be created by combining these objects. FIG. 5C illustrates an example viewable scene that includes a first object, Roman bust 500, integrated with a second object, school room 510. An application program used to create the scene in FIG. 5C is an authoring tool. The authoring tool is an application program which allows a user to acquire objects and place them into a scene. Authoring tools may rely on the API provided by the MPS to allow a user to create a scene.

Figure 5D:
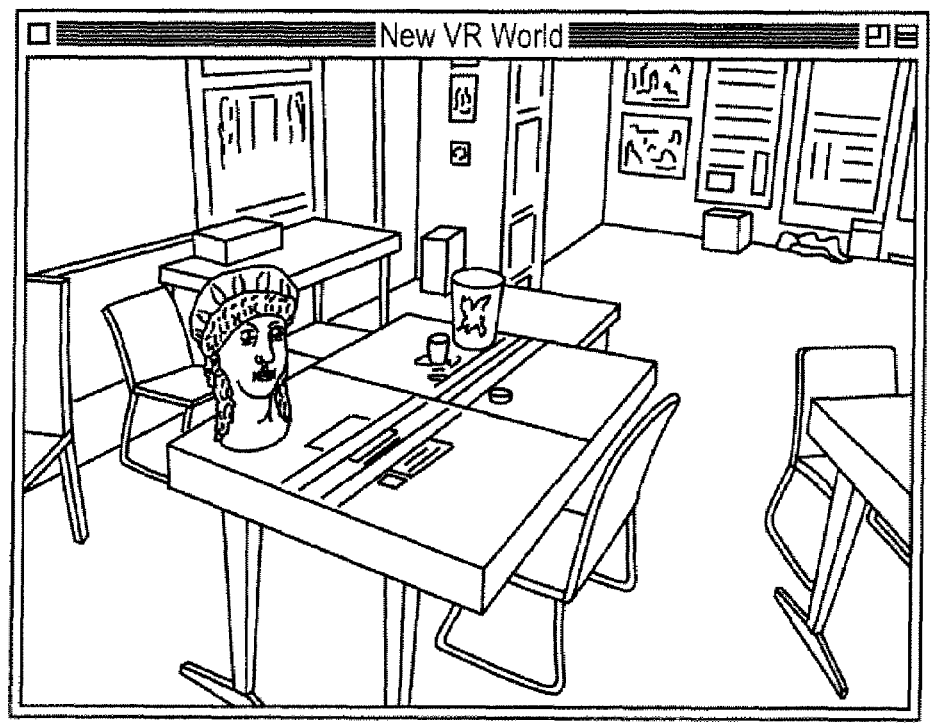
Figure 5E:
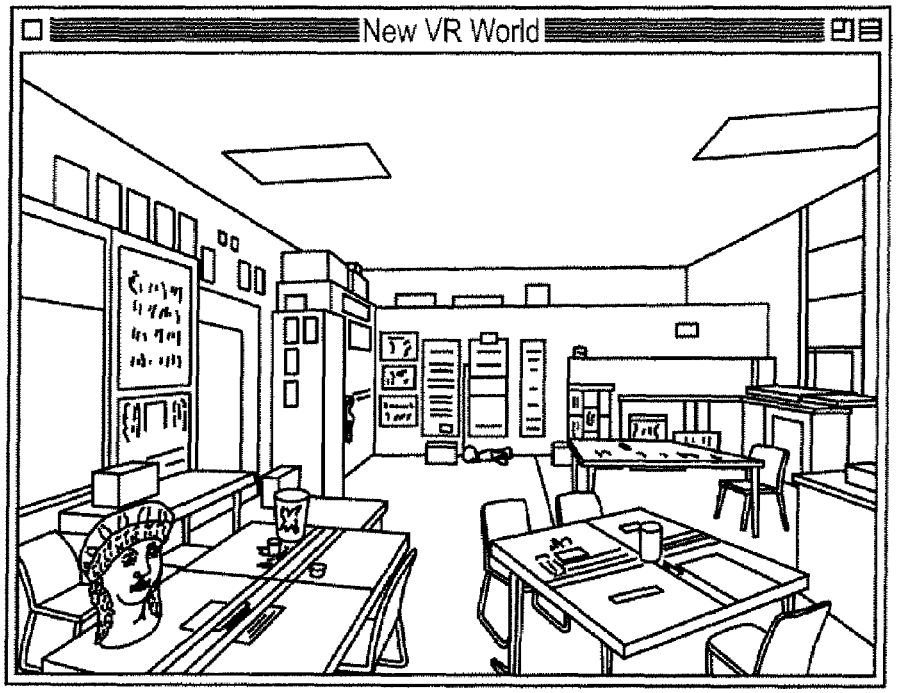
FIG. 5E illustrates an example viewable scene that includes a first object integrated with a second object after the scene has been panned to the left.
Figure 5F:
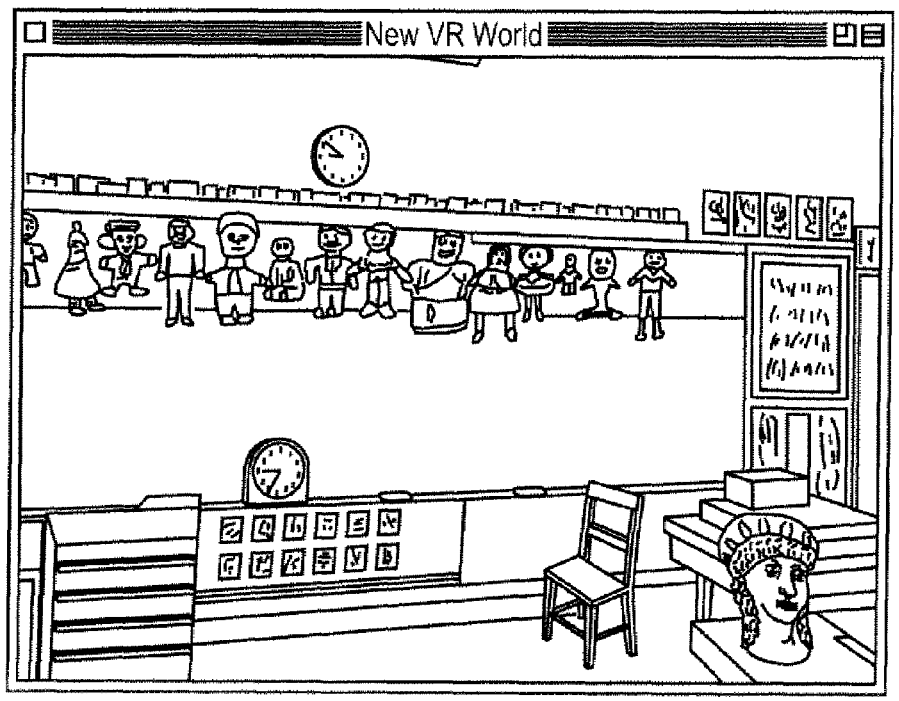
FIG. 5F illustrates an example viewable scene that includes a first object integrated with a second object after the scene has been panned to the right.

After a scene created with an authoring tool is displayed, a user may provide input to manipulate the user's view of the scene. This may be referred to as manipulating the camera, such as by panning, tilting, translation, and zooming. As set forth above regarding FIG. 2, when user input is received, the MPS invokes the appropriate call-back routine of the application program that displayed the scene to handle the manipulation request. The application program will then use the API of the MPS to manipulate the objects and the scene to display the manipulated scene according to the changed camera view. The MPS processes the revised location of each of the objects in relation to the scene and the manipulation request and then uses existing library functions to manipulate each of the objects to an appropriate orientation scene and then to display the scene. For example, FIG. 5D illustrates an example viewable scene that includes a first object, Roman bust 500, integrated with a second object, school room 510, after the field of view of the scene has been changed by zooming in. FIG. 5E illustrates an example viewable scene that includes a first object, Roman bust 500, integrated with a second object, school room 510, after the scene has been panned to the left. FIG. 5F illustrates an example viewable scene that includes a first object, Roman bust 500, integrated with a second object, school room 510, after the scene has been panned to the right.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The invention claimed is:

1. A computer implemented method comprising:
    receiving by the computer, a first request to create a three-dimensional virtual reality scene;
    receiving a second request to add at least two media objects to the virtual reality scene, wherein each media object is two-dimensional;
    associating each media object with a series of two-dimensional views of the media object from various orientations and locations in three dimensional space;
    preparing a translation vector and a rotation matrix for each of the media objects, the rotation matrix and the translation matrix defining an orientation and a location of each of the media objects in the virtual reality scene, wherein each two-dimensional view of each media object defines a different orientation of each media object;
    building the virtual reality scene for display, wherein
        the virtual reality scene combines the at least two media objects and includes data about each media object and a relationship of each media object to the scene including layering data to be used to determine foreground and background relationships between the media objects, and
        the virtual reality scene is translatable and rotatable, and wherein translating and rotating the virtual reality scene results in changing the respective two-dimensional views of the media objects, including the layering of the media objects within the scene, to give the appearance of the media objects having three dimensional qualities.

2. The computer implemented method of claim 1 further comprising:
    receiving a third request to manipulate the virtual reality scene; and
    manipulating the virtual reality scene.

3. The computer implemented method of claim 2 further comprising:
    updating the translation vector and rotation matrix for each of the media objects responsive to receiving the third request to manipulate the scene.

4. The computer implemented method of claim 2 wherein the third request to manipulate is received from an application program.

5. The computer implemented method of claim 2 wherein the third request to manipulate originates from a user.

6. The computer implemented method of claim 2 wherein the third request to manipulate is one of a pan request, a zoom request, and a tilt request.

7. The computer implemented method of claim 2 further comprising:
calling one or more library functions of a plurality of library functions to manipulate the media objects.

8. The computer implemented method of claim 7 wherein the library functions are included in an operating system enhancement application program interface.

9. The computer implemented method of claim 2 additionally comprising:
receiving a fourth request to build a camera view of the virtual reality scene, the camera view including the at least two media objects in the virtual reality scene; and
rendering the at least one camera view of the virtual reality scene.

10. The computer implemented method of claim 1 further comprising:
receiving a selection of a first media object of the media objects within the scene.

11. The computer implemented method of claim 10 further comprising:
receiving a third request to manipulate the first media object.

12. The computer implemented method of claim 11 further comprising:
updating the translation vector and rotation matrix for the first media object responsive to receiving the third request to manipulate the first media object.

13. The computer implemented method of claim 11 wherein the third request to manipulate originates from a user.

14. The computer implemented method of claim 11 wherein the third request to manipulate is one of a pan request, a zoom request, and a tilt request.

15. The computer implemented method of claim 11 further comprising:
calling one or more library functions of a plurality of library functions to manipulate the media objects.

16. The computer implemented method of claim 15 wherein the library functions are included in an operating system enhancement application program interface.

17. The computer implemented method of claim 1 wherein each media object further comprises:
a soundtrack associated with each media object such that the soundtrack is to be played when the media object is selected by a user.

18. The computer implemented method of claim 17 wherein the soundtrack is to be played responsively to movement of the associated media object.

19. The computer implemented method of claim 1 further comprising:
receiving a designation of a soundtrack to be played in conjunction with the displaying of the scene.

20. The computer implemented method of claim 19 wherein the soundtrack is played by calling one or more library functions of a plurality of library functions.

21. The computer implemented method of claim 1 wherein displaying comprises:
calling one or more library functions of a plurality of library functions to display the media objects.

22. A computer implemented method comprising:
storing by the computer, a first function to allow an application program to create a three-dimensional virtual reality scene, wherein the scene is to be able to be translated and rotated;
receiving a request for execution of the first function;
storing a second function to allow the application program to add at least two media objects, wherein each media object is two-dimensional, to the virtual reality scene and to associate each media object with a series of two-dimensional views of the object from various orientations and locations in three dimensional space, responsive to the request to execute the first function, wherein the virtual reality scene combines the media objects and includes data about each object and a relationship of each media object to the scene including layering data to be used to determine foreground and background relationships between the media objects, wherein each two-dimensional view of each media object defines a different orientation of each media object; and
receiving a request for execution of the second function; and
preparing a translation vector and a rotation matrix for each of the media objects, the rotation matrix and the translation matrix defining an orientation and a location of each of the media objects in the virtual reality scene responsive to the request to execute the second function, and wherein translating and rotating the virtual reality scene results in changing the respective two-dimensional views of the media objects, including the layering of the media objects within the scene, to give the appearance of the media objects having three dimensional qualities.

23. The computer implemented method of claim 22 further comprising:
storing a third function to render the virtual reality scene and the media objects in the virtual reality scene;
receiving a request for execution of the third function; and
rendering the virtual reality scene responsive to receiving the request to execute the third function.

24. The computer implemented method of claim 23 further comprising:
receiving a request from a user to manipulate the virtual reality scene.

25. The computer implemented method of claim 24 further comprising:
updating the translation vector and rotation matrix for each of the media objects responsive to receiving the request to manipulate the virtual reality scene.

26. The computer implemented method of claim 24 wherein the request to manipulate is one of a pan request, a zoom request, and a tilt request.

27. The computer implemented method of claim 24 further comprising:
calling one or more library functions of a plurality of library functions to manipulate the media objects.

28. The computer implemented method of claim 27 wherein the library functions are included in an operating system enhancement application program interface.

29. A system comprising:
means for receiving a first request to create a three-dimensional virtual reality scene;
means for receiving a second request to add at least two media objects to the virtual reality scene, wherein each media object is two-dimensional;
means for associating each media object with a series of two-dimensional views of the object from various orientations and locations in three dimensional space;
means for preparing a translation vector and a rotation matrix for each of the media objects, the rotation matrix and the translation matrix defining an orientation and a location of each of the media objects in the virtual reality scene, wherein each two-dimensional view of each media object defines a different orientation of each media object; and means for building the virtual reality scene for display, wherein
the at least two media objects are combined within the virtual reality scene, and the virtual reality scene is translatable and rotatable and includes data about each media object and a relationship of each media object to the scene including layering data to be used to determine foreground and background relationships between the media objects, and wherein translating and rotating the virtual reality scene results in changing the respective two-dimensional views of the media objects, including the layering of the media objects within the scene, to give the appearance of the media objects having three-dimensional qualities.

30. The system of claim 29 further comprising:
means for receiving from a user a third request to manipulate the virtual reality scene; and
means for manipulating the virtual reality scene.

31. The system of claim 30 further comprising:
means for updating the translation vector and rotation matrix for each of the media objects responsive to the means for receiving from the user the third request to manipulate the scene.

32. The system of claim 30 wherein the third request to manipulate is one of a pan request, a zoom request, and a tilt request, and the system further comprises:
means for panning;
means for zooming; and
means for tilting.

33. The system of claim 30 further comprising:
means for calling one or more library functions of a plurality of library functions to manipulate the media objects.

34. The system of claim 33 wherein the library functions are included in an operating system enhancement application program interface.

35. The system of claim 29 wherein each media object further comprises:
a soundtrack associated with each media object such that the soundtrack is to be played when the media object is selected by a user.

36. The system of claim 35 further comprising:
means for playing the soundtrack responsively to movement of the associated media object.

37. The system of claim 29 further comprising:
means for receiving a designation of a soundtrack to be played in conjunction with the displaying of the scene.

38. The system of claim 37 further comprising:
means for calling one or more library functions of a plurality of library functions to play the soundtrack.

39. The system of claim 29 wherein displaying comprises:
means for calling one or more library functions of a plurality of library functions to display the media objects.

40. A machine readable storage medium storing executable instructions which cause a processor to perform operations comprising:
receiving a first request to create a three-dimensional virtual reality scene;
receiving a second request to add at least two media objects to the virtual reality scene, wherein each media object is two-dimensional;
associating each media object with a series of two-dimensional views of the media object from various orientations and locations in three dimensional space;
preparing a translation vector and a rotation matrix for each of the media objects, the rotation matrix and the translation matrix defining an orientation and a location of each of the media objects in the virtual reality scene, wherein each two-dimensional view of each media object defines a different orientation of each media object;
building the virtual reality scene for display, wherein
the virtual reality scene combines the at least two media objects and includes data about each media object and a relationship of each media object to the scene including layering data to be used to determine foreground and background relationships between the media objects, and
the virtual reality scene is translatable and rotatable, and wherein translating and rotating the virtual reality scene results in changing the respective two-dimensional views of the media objects, including the layering of the media objects within the scene to give the appearance of the media objects having three dimensional qualities.

41. The machine readable storage medium of claim 40 wherein the processor performs further operations comprising:
receiving from a user a third request to manipulate the virtual reality scene; and
manipulating the virtual reality scene, wherein manipulating is at least one of translating the virtual reality scene and rotating the virtual reality scene with respect to at least one camera view.

42. The machine readable storage medium of claim 41 wherein the processor performs further operations comprising:
updating the translation vector and rotation matrix for each of the media objects responsive to receiving the third request to manipulate the scene.

43. The machine readable storage medium of claim 41 wherein the third request to manipulate is one of a pan request, a zoom request, and a tilt request.

44. The machine readable storage medium of claim 41 wherein the processor performs further operations comprising:
calling one or more library functions of a plurality of library functions to manipulate the media objects.

45. The machine readable storage medium of claim 44 wherein the library functions are included in an operating system enhancement application program interface.

46. The machine readable storage medium of claim 40 wherein each media object further comprises:
a soundtrack associated with each media object such that the soundtrack is to be played when the media object is selected by a user.

47. The machine readable storage medium of claim 46 wherein the soundtrack is to be played responsively to movement of the associated media object.

48. The machine readable storage medium of claim 40 wherein the processor performs further operations comprising:
receiving a designation of a soundtrack to be played in conjunction with the displaying of the scene.

49. The machine readable storage medium of claim 48 wherein the soundtrack is to be played by calling one or more library functions of a plurality of library functions.

50. The machine readable storage medium of claim 40 wherein the displaying comprises:
calling one or more library functions of a plurality of library functions to display the media objects.

51. The machine readable medium of claim 41 wherein the processor performs further operations comprising:

receiving a fourth request to build a camera view of the virtual reality scene, the camera view including the at least two media objects in the virtual reality scene; and rendering the at least one camera view of the virtual reality scene.

52. A machine readable storage medium storing executable instructions which cause a processor to perform operations comprising:

storing a first function to allow an application program to create a three-dimensional virtual reality scene, wherein the scene is to be able to be translated and rotated;

receiving a request for execution of the first function;

storing a second function to allow the application program to add at least two media objects, wherein each media object is two-dimensional, to the virtual reality scene and to associate each media object with a series of two-dimensional views of the object from various orientations and locations in three dimensional space, responsive to the request to execute the first function, wherein the virtual reality scene combines the media objects and includes data about each object and a relationship of each media object to the scene including layering data to be used to determine foreground and background relationships between the media objects, wherein each two-dimensional view of each media object defines a different orientation of each media object;

receiving a request for execution of the second function; and preparing a translation vector and a rotation matrix for each of the media objects, the rotation matrix and the translation matrix defining an orientation and a location of each of the media objects in the virtual reality scene responsive to the request to execute the second function, and wherein translating and rotating the virtual reality scene results in changing the respective two-dimensional views of the media objects, including the layering of the media objects within the scene, to give the appearance of the media objects having three dimensional qualities.

53. The machine readable storage medium of claim 52 wherein the processor performs further operations comprising:

providing a third function to render the virtual reality scene and the media objects in the virtual reality scene;

receiving a request for execution of the third function; and rendering the virtual reality scene responsive to receiving the request to execute the third function.

54. The machine readable storage medium of claim 53 wherein the processor performs further operations comprising:

receiving a request from a user to manipulate the scene.

55. The machine readable storage medium of claim 54 wherein the processor performs further operations comprising:

updating the translation vector and rotation matrix for each of the media objects responsive to receiving the request to manipulate the scene.

56. The machine readable storage medium of claim 54 wherein the request to manipulate is one of a pan request, a zoom request, and a tilt request.

57. The machine readable storage medium of claim 54 wherein the processor performs further operations comprising:

calling one or more library functions of a plurality of library functions to manipulate the media objects.

58. The machine readable storage medium of claim 57 wherein the library functions are included in an operating system enhancement application program interface.

59. The machine readable storage medium of claim 54 wherein the operations further comprise, in response to a request to navigate within the virtual reality scene, replacing a displayed view of the media object in the scene with a different view in the series of views based on the translation vector and rotation matrix to reorient and relocate the object to match the navigation.

60. The machine readable storage medium of claim 52 wherein the series of views is captured by a camera rotated about a subject of the media object.

61. The machine readable storage medium of claim 52 wherein the series of views is captured by a camera directed at a rotated subject of the media object.

62. The machine readable storage medium of claim 52 wherein the series of views is determined algorithmically when the media object is added to the virtual reality scene.

63. A computer implemented method comprising:

receiving, by the computer, a first request to create a three-dimensional virtual reality scene, wherein the virtual reality scene is associated with a series of two-dimensional views of the scene from various orientations or locations in three-dimensional space;

receiving a second request to add at least one media object to the virtual reality scene, wherein the media object is two-dimensional;

associating the media object with a series of two-dimensional views of the media object from various orientations or locations in three dimensional space;

preparing a translation vector and a rotation matrix for the media object, the rotation matrix and the translation matrix defining an orientation and a location of the media object in the virtual reality scene, wherein each two-dimensional view of the media object defines a different orientation of the media object and corresponds to a two-dimensional view of the virtual reality scene;

building the virtual reality scene for display, wherein the media object is included within the virtual reality scene, and the virtual reality scene is translatable and rotatable, and wherein translating and rotating the virtual reality scene results in changing the respective two-dimensional views of the media object to give the appearance of the media object having three dimensional qualities.

64. The computer implemented method of claim 61 further comprising:

receiving a third request to manipulate the virtual reality scene; and updating the translation vector and rotation matrix for the media object responsive to receiving the third request to manipulate the scene.

65. The computer implemented method of claim 64 wherein the third request to manipulate is one of a pan request, a zoom request, and a tilt request.

66. The computer implemented method of claim 63 further comprising:

receiving a third request to manipulate the media object and updating the translation vector and rotation matrix for the media object responsive to receiving the third request to manipulate the media object.

67. The computer implemented method of claim 66 wherein the third request to manipulate is one of a pan request, a zoom request, and a tilt request.

68. The computer implemented method of claim 63, wherein the media object further comprises a soundtrack associated with the object such that the soundtrack is to be played when the media object is selected by a user, or in response to a movement of the media object.

69. A machine readable storage medium storing executable instructions which cause a processor to perform operations comprising:

receiving a first request to create a three-dimensional virtual reality scene, wherein the virtual reality scene is associated with a series of two-dimensional views of the scene from various orientations or locations in three-dimensional space;

receiving a second request to add at least one media object to the virtual reality scene, wherein the media object is two-dimensional;

associating the at least one media object with a series of two-dimensional views of the media object from various orientations or locations in three dimensional space;

preparing a translation vector and a rotation matrix for the media objects, the rotation matrix and the translation matrix defining an orientation and a location of the at least one media object in the virtual reality scene, wherein each two-dimensional view of the at least one media object defines a different orientation of the at least one media object and corresponds to a two-dimensional view of the virtual reality scene;

building the virtual reality scene for display, wherein the at least one media object is included within the virtual reality scene, and the virtual reality scene is translatable and rotatable, and wherein translating and rotating the virtual reality scene results in changing the respective two-dimensional views of the at least one media object to give the appearance of the at least one media object having three dimensional qualities.

70. The computer implemented method of claim 69 further comprising:

receiving a third request to manipulate the virtual reality scene; and updating the translation vector and rotation matrix for the media object responsive to receiving the third request to manipulate the scene.

71. The machine readable storage medium of claim 70 wherein the third request to manipulate is one of a pan request, a zoom request, and a tilt request.

72. The machine readable storage medium of claim 69 further comprising:

receiving a third request to manipulate the media object and updating the translation vector and rotation matrix for the media object responsive to receiving the third request to manipulate the media object.

73. The machine readable storage medium of claim 72 wherein the third request to manipulate is one of a pan request, a zoom request, and a tilt request.

74. The machine readable storage medium of claim 69, wherein the media object further comprises a soundtrack associated with the object such that the soundtrack is to be played when the media object is selected by a user, or in response to a movement of the media object.

75. A system comprising:

means for receiving a first request to create a three-dimensional virtual reality scene wherein the virtual reality scene is associated with a series of two-dimensional views of the scene from various orientations or locations in three-dimensional space;

means for receiving a second request to add at least one media object to the virtual reality scene, wherein the at least one media object is two-dimensional;

means for associating the at least one media object with a series of two-dimensional views of the object from various orientations or locations in three dimensional space;

means for preparing a translation vector and a rotation matrix for the at least one media objects, the rotation matrix and the translation matrix defining an orientation and a location of each of the media objects in the virtual reality scene, wherein each two-dimensional view of each media object defines a different orientation of each media object and corresponds to a two dimensional view of the virtual reality scene; and means for building the virtual reality scene for display, wherein the at least two media objects are included within the virtual reality scene, and the virtual reality scene is translatable and rotatable, and wherein translating and rotating the virtual reality scene results in changing the respective two-dimensional views of the objects to give the appearance of the media objects having three-dimensional qualities.

\* \* \* \* \*

UNITED STATES PATENT AND TRADEMARK OFFICE
CERTIFICATE OF CORRECTION

| | |
|---|---|
| PATENT NO. | : 7,631,277 B1 |
| APPLICATION NO. | : 10/022151 |
| DATED | : December 8, 2009 |
| INVENTOR(S) | : Nie et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Second Day of November, 2010

David J. Kappos
*Director of the United States Patent and Trademark Office*